UNITED STATES PATENT OFFICE.

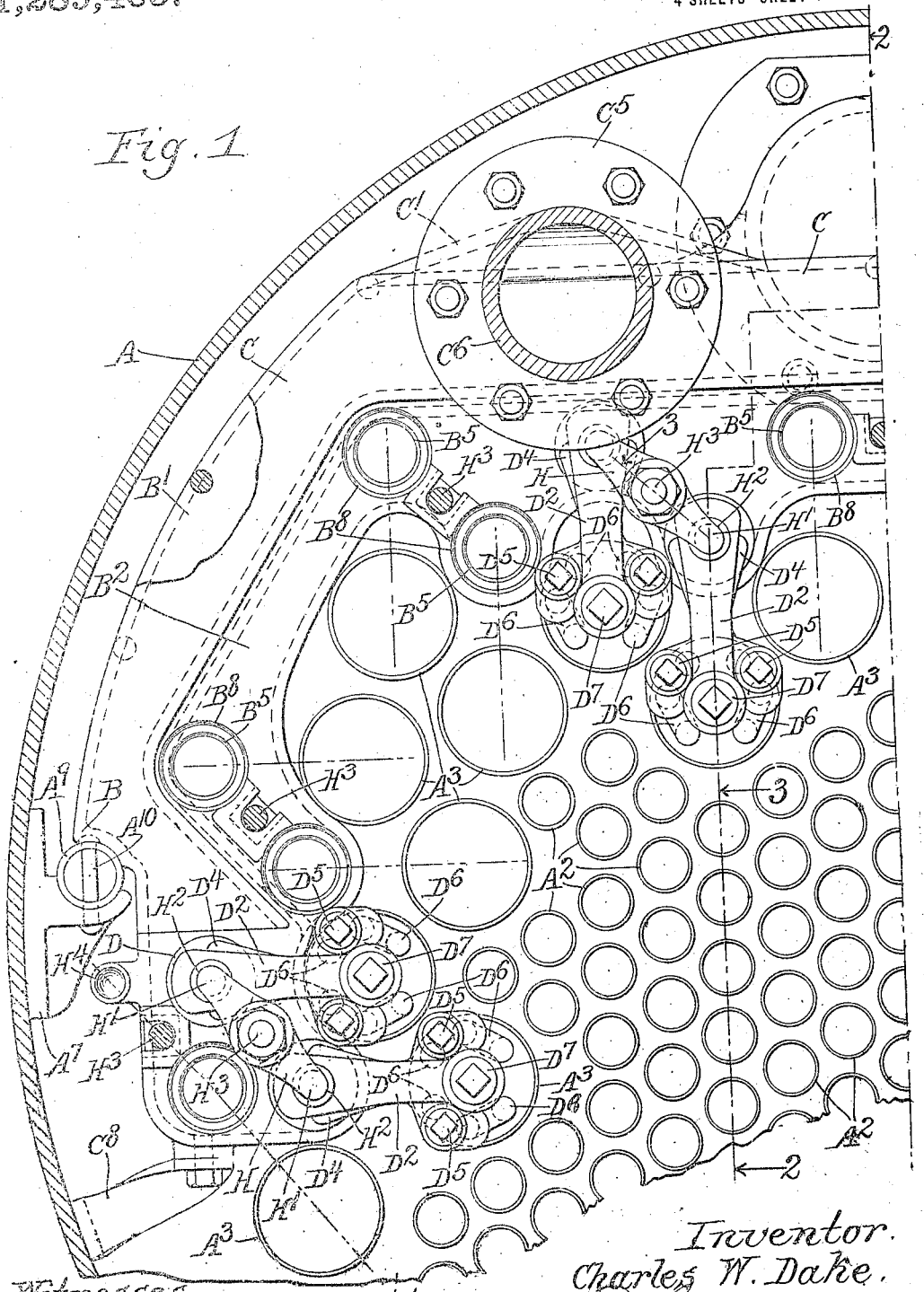

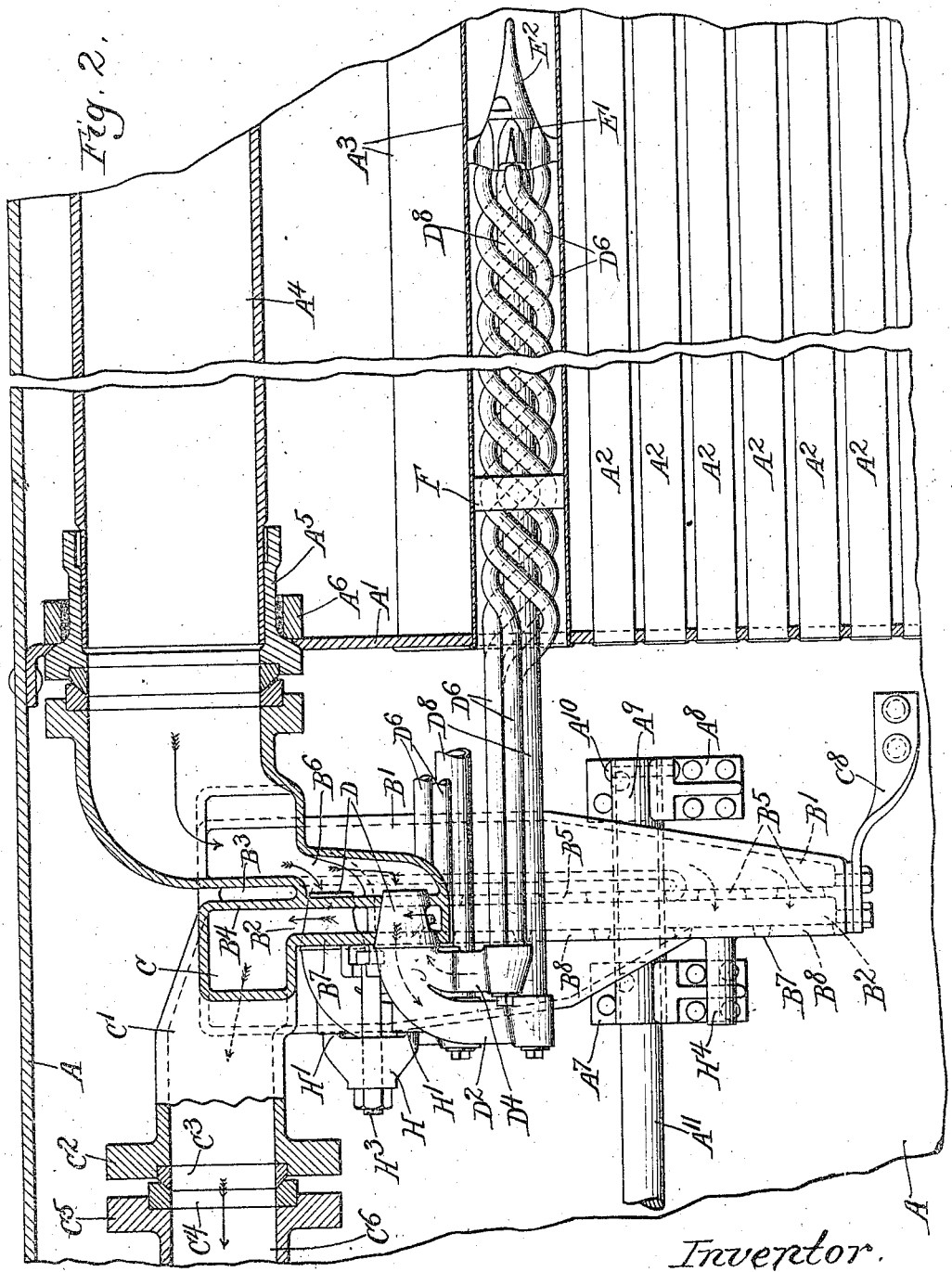

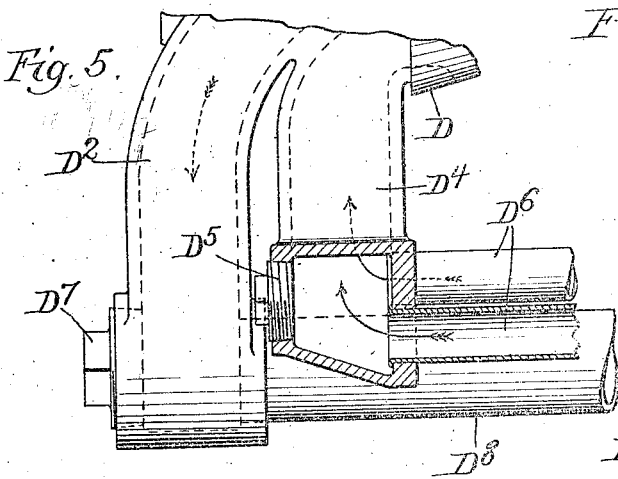
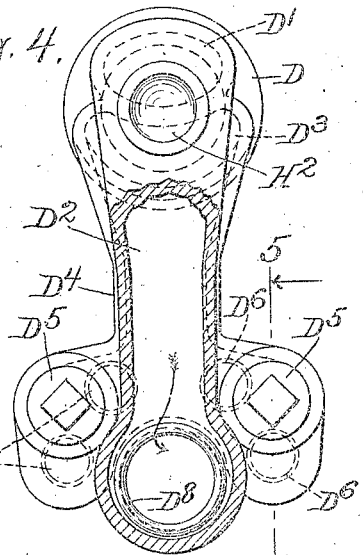
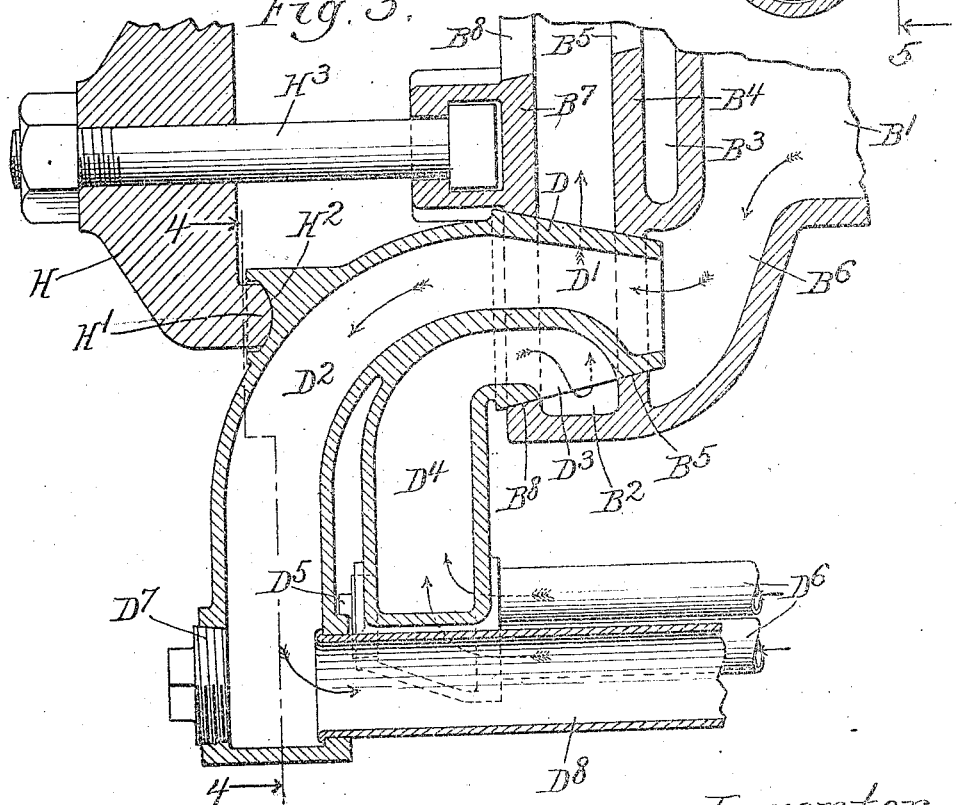

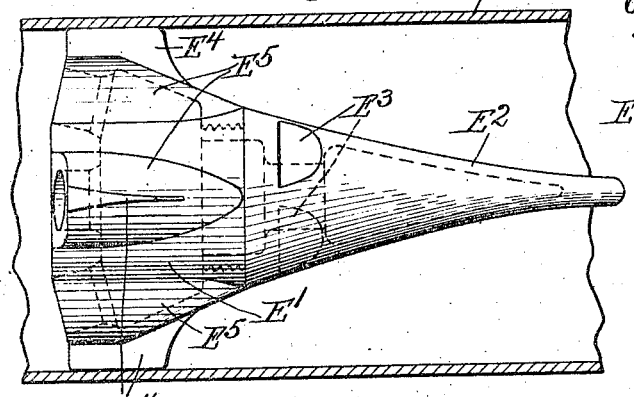
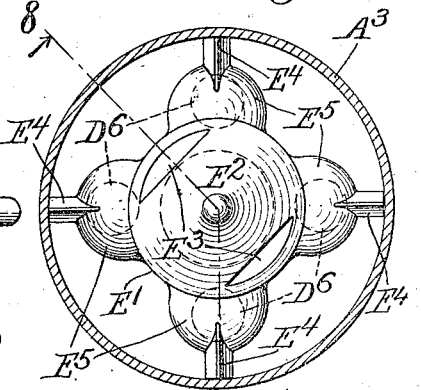
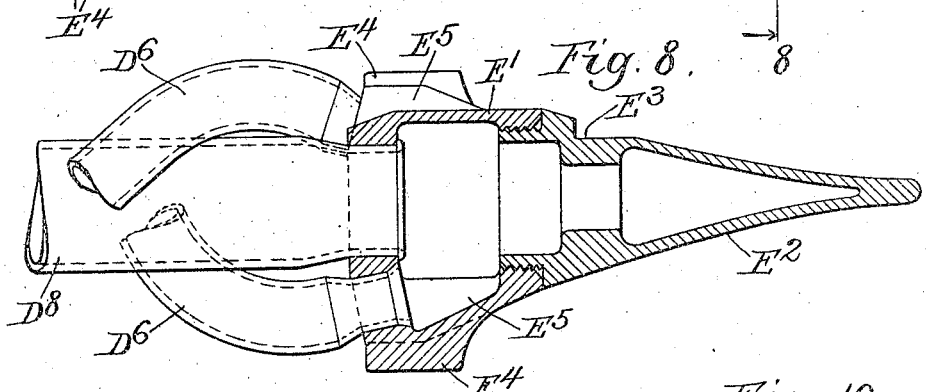
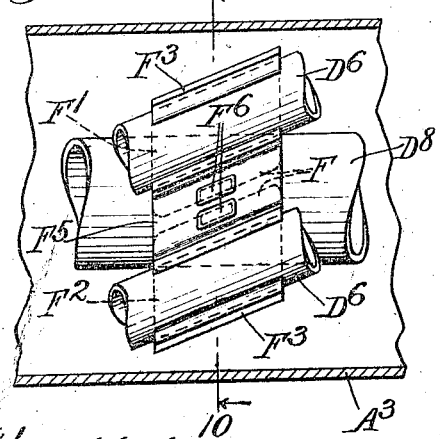
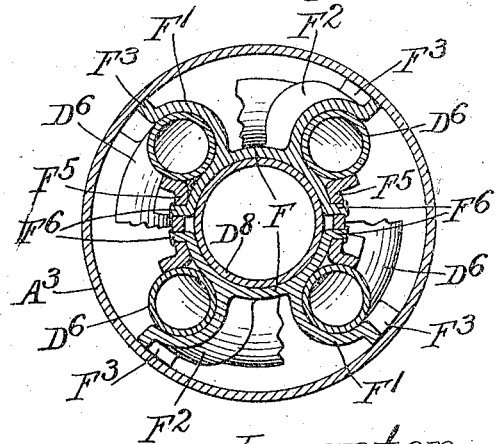

CHARLES W. DAKE, OF CHICAGO, ILLINOIS.

SUPERHEATER.

1,289,405.

Specification of Letters Patent. Patented Dec. 31, 1918.

Application filed May 11, 1916. Serial No. 96,739.

*To all whom it may concern:*

Be it known that I, CHARLES W. DAKE, a citizen of the United States, residing at Chicago, in the county of Cook and State of Illinois, have invented a certain new and useful Improvement in Superheaters, of which the following is a specification.

My invention relates to improvements in superheaters and has for one object to provide a superheater for use in connection with locomotive boilers and the like, wherein a minimum of special flues are used, wherein a maximum superheating area is available, wherein the superheater units may be easily and conveniently separately removed, and wherein the whole superheater arrangement may be removed for inspection without interfering with the set up of the individual parts. Other objects of my invention will appear from time to time in the specification. The invention is illustrated more or less diagrammatically in the accompanying drawings, wherein:

Figure 1 is a detailed section through the smoke box of a locomotive showing one side only with parts in elevation and parts in section and parts omitted;

Fig. 2 is a section along the broken line 2—2 of Fig. 1;

Fig. 3 is a section along the line 3—3 of Fig. 1 on an enlarged scale;

Fig. 4 is a section along the line 4—4 of Fig. 3;

Fig. 5 is a section along the line 5—5 of Fig. 4;

Fig. 6 is a side elevation of the cap on the fire box end of one of the superheater sections;

Fig. 7 is a section through the flue showing this cap in elevation;

Fig. 8 is a section along the line 8—8 of Fig. 7;

Fig. 9 is a section through a flue showing a part of the superheater section in elevation, illustrating the spacing arrangement;

Fig. 10 is a section along the line 10—10 of Fig. 9.

Like parts are indicated by like characters in all the drawings.

A is the wall of the smoke box. $A^1$ is the front end or head of the boiler. This wall $A^1$ also forms the back wall of the smoke box. $A^2$ $A^2$ are a series of the usual type of locomotive fire tubes or flues beaded or otherwise attached to the wall of the boiler and communicating with the fire box not here shown. $A^3$ $A^3$ are a series of large size or superheater fire tubes or flues. These fire tubes are within the boiler and beaded or otherwise attached to the front wall of the boiler, in the usual manner, but they are much larger than the ordinary sized flue, and are intended to contain the superheater elements which in accordance with the usual practice are so large as not to go into the ordinary sized flue. In my preferred form I provide twenty of these large flues, because I find that by my arrangement twenty superheater sections are enough to give me the desired heating area.

$A^4$ is a dry steam pipe which terminates in a sleeve $A^5$ provided with a packing nut $A^6$ to hold it firmly and rigidly in position in the boiler head $A^1$. $A^7$ $A^8$ are superheater supporting brackets mounted on the side walls of the smoke box A and joined by hollow tubes $A^9$, held in position by the pin $A^{10}$ and open at their forward ends to contain a removable bar $A^{11}$ which bar is provided and expected to be used only in connection with the shop work necessary for disassembling the boiler and superheater. The bars under such circumstances furnish a continuation of the supporting tubes or pipes and permit the whole superheater to be moved forward away from the front of the boiler and supported on such pipes in line with it removed from the boiler.

I provide as shown in one unit or casting a combined saturated and superheated steam header which is arranged in substantially horse-shoe shape and is provided on opposed sides with shoulders or lugs B so positioned and disposed as to rest when the superheater is in operative position in the boiler one on each of the tubes $A^9$. I have indicated the saturated steam part of the header as $B^1$ and the superheated steam part as $B^2$. These two header parts are arranged one behind the other. They are separated by an air space $B^3$ throughout a portion of their area and in every case they are separated by the wall $B^4$. This wall $B^4$ is provided with a series of apertures $B^5$ therethrough. These apertures where the saturated and superheated headers are separated by an air chamber communicate with passages $B^6$ leading from the saturated steam header. The front wall $B^7$ of the superheated steam header is provided with apertures $B^8$ in register with the apertures $B^5$. The apertures $B^5$ and $B^8$ are bounded by concentric, conical walls such that a single conical plug which will be later described will feed into them both simultaneously. The apertures or perforations $B^3$, $B^3$ in the walls of the headers are so disposed with relation to the superheater flues that each one of the superheater elements which I am about to describe may be placed in any one of the flues without change and may then be connected to the appropriate or expected point on the header without change or distortion, thus giving an absolutely interchangeable group of superheater elements.

The superheated steam header $B^2$ which is located in front of the saturated steam header is provided with an enlarged chamber C extending clear across the top of the header and communicating on either side of the axial line of the boiler with an elbow $C^1$. Each one of these elbows $C^1$ is flanged as at $C^2$ and is provided with a packing ring $C^3$ in spherical engagement with a packing ring $C^4$ in a flange $C^5$ on the end of one of the steam supply pipes $C^6$, which pipes lead in the present preferred arrangement each to one of the engines, the packing being held tight by bolts and nuts as indicated to furnish a steam-tight passage from the header to each engine. These steam pipes while they are connected one to each side of the header nevertheless are so disposed and the size of the header chamber is such that as one engine draws steam from the header that steam will be provided and come to the pipe feeding the engine from all points of the header. Thus the steam in the space between the two steam pipes will be free to change its direction of travel so that each pipe in turn is fed from the whole header. $C^8$ $C^8$ are stay or supporting straps bolted to the lower ends of the header. These are anchored on the side walls of the smoke box A, A as indicated to steady the superheater so that the superheater while supported and carried by the brackets, is steadied by these straps and by the steam pipe connections in part so that the header is stayed against rocking movement both above and below and its weight is carried at a central point. The superheater flues in the boiler are arranged just inside the horse-shoe formed by the header and there staggered as shown in order that they may occupy a minimum of space in the boiler head.

D is a conical plug. It is adapted to project in through the perforation $B^3$ and the perforation $B^5$ and seat upon the conical walls of both such perforations to make a close steam tight joint at each such seat. $D^1$ is a passage extending clear through such plug adapted to communicate at one end with the passage $B^6$ leading to the saturated steam header, at the other end with a chamber $D^2$ contained within an integral curved extension projecting from the plug. $D^3$ is a passage extending part way through the plug and communicating through the side wall thereof with the interior of the superheated steam header. It communicates with a chamber $D^4$ which chamber is contained within a casing integral with the plug. This chamber $D^4$ has an enlarged end adjacent the end of the chamber $D^2$ and on either side of such chamber are apertures closed by screw plugs $D^5$ whereby access may be had to perforations in the opposed wall in which are mounted the superheater return pipes $D^6$ which pipes are beaded in position. The pipe $D^2$ terminates in a part having an aperture closed by a screw-threaded plug $D^7$ opposite to an aperture containing a steam pipe $D^8$, which pipe is also beaded in position. The arrangement of the integral casting consisting of plug and these connecting chambers is such that when the plug is in position the connecting members extend out toward and over one of the superheater flues so that the superheater element projects into such superheater flue.

This superheater element consists in the pipe $D^8$ which extends into the interior of the flue toward the fire box and terminates in a reduced end portion beaded into a cap $E^1$. This cap $E^1$ is provided with a screw-threaded conical pointed cover $E^2$ which is in line with the axis of the pipe and projects beyond its end toward the fire box. This screw-threaded cap is squared as at $E^3$ so that it may be turned in position by a wrench. The cap $E^1$ is provided with the four spacing ribs $E^4$ adapted to rest against the inside walls of the flue to hold the cap cover and pipe all in a central position within the flue. These ribs, where they project out from the housing, are V-shaped so as to offer a minimum resistance to the passage of the gases through the flue and the contour of the ribs and the cap cover are such that there will be little if any tendency for solids from the flue gases to deposit thereupon. The cap $E^1$ is provided with four enlarged circular chambers $E^5$ in communication with the interior of the cap having their bottom walls apertured to contain the reduced ends of the superheater return pipes $D^6$ which are beaded into position. I have shown here four such return pipes. There might be more or less. These pipes $D^6$ are wound spirally about the central steam pipe and are out of contact with it and out of contact with the wall of the flue. They extend back toward the front of the boiler and where they leave the boiler each becomes again parallel with the central pipe. These four pipes are spread apart in two pairs so as to engage the opposed sides of the connecting chamber which communicates with the central union plug.

The spiral return pipes are held in fixed operative position with respect to and out of contact with both flue walls and the central superheating pipe by means of a special type of spacer, which interferes little if any with the passage of gas through the flue. This spacer is made up of two semi-cylindrical saddles F adapted to rest upon and partially surround the pipe $D^8$. Each of these saddles carries two outwardly extended spirally arranged semi-cylindrical brackets or flanges $F^1$, $F^2$ having extensions $F^3$ projecting out in a substantially radial direction to contact the flue walls. One of the spiral return pipes rests against each of these brackets and is clamped in position therein by a perforate wedge plate $F^5$, there being two such plates for each pair of saddles. The ends of the saddles are bent up as at $F^6$ to pass through the perforations in the wedge plates and these upwardly bent ends are riveted over to permanently fasten the parts together. The wedge plates are provided with opposed flanges, which flanges have curved surfaces to engage the pipes so that when the saddles are in place and the wedge plates are riveted down the five pipes are all held firmly and rigidly together in position.

H is a holding dog. It has plug engaging ball contacts $H^1$, $H^1$ on either end. These engage ball seats $H^2$ one on each plug. The bolt $H^3$ is adapted to clamp the dog against such contacts to hold the plugs in position. Where at the end of the header there is only one plug available the dog is balanced by exerting its pressure at one end against a lug $H^4$ as indicated.

It will be evident that while I have shown in my drawings an operative device, still many changes might be made both in size, shape and arrangement of parts without departing materially from the spirit of my invention, and I wish, therefore, that my drawings be regarded as in a sense diagrammatic.

The use and operation of my invention are as follows:

When a fire is made in the boiler steam is generated and this steam passes through the dry pipe into the saturated steam header. It passes thence through the superheater elements, being heated while passing through them by the flue gases impinging directly upon the walls of the pipe containing the superheated steam. This steam returns as superheated steam to the superheated steam header, whence it is drawn off to supply the engines.

Each superheater element is exactly the same as each other superheater element and all the elements may be used interchangeably. The distance between the anchor point or connection point for any element and the flue in which that element is to lie is exactly the same as the corresponding distance from any other flue to its adjacent anchor or connection point. Each element is held in position in operative relation to the two superheater headers by a single uniform holding mechanism and any one element may be withdrawn without interfering with or in any way affecting any other element. Each element is supported in the flue in which it lies, and is not supported by but is only connected to the header so that when it is desired to withdraw the header with superheater elements attached to it as a unit, it is necessary only to break the steam connections, unbolt the holding strips at the lower ends of the header arms and slide the header as a unit out away from the boiler head, allowing it to travel along the supporting hollow tubes on either side of the smoke box. If heavy bars are thrust into the hollow tubes to project out beyond the smoke box, the superheater may be drawn out, sliding along such bars, the inner ends of the elements being supported by the boiler itself until the header is drawn out so far that the tubes no longer touch the boiler flues. The supporting contact between the header and the cross tubes which carry it is a friction contact such that the smoke box, the header and the tubes are all free to expand and contract independently, any change in position, size or shape being completely and easily compensated for by sliding of the superheater along the tubes upon which it is mounted, and by rotation in the ball joints.

The steam joints between the headers and the boiler and the engine are packed by means of spherical packing rings so that there is here no interference with slight changes in position or size. The members are free to give and move in the usual manner.

The individual superheater elements are made up preferably of a central supply pipe which pipe is substantially parallel with the axis of the flue. It is capped by a similar closure or header into which a reduced end of the pipe is beaded. This header has the pointed cap as indicated pointed toward the direction from which the flue gases travel so as to prevent deposition of solids thereon. Spiral return pipes surround the center pipe, being reduced at their ends to engage and be beaded into the cap closing the end of the central pipe. These spiral pipes extend back to the front of the boiler where they leave the boiler front, they become parallel with the central pipe and the central pipe and the four spiral pipes are all of them beaded into the chambers in the housing which is integral with the conical plug whereby the connection is effected between the saturated header and the central pipe and the superheated header and the spiral pipe. This housing, including the plug, overhangs the end of the boiler projecting out from the header so that no curvature of the pipes is necessary to permit the superheater element to extend straight into the flue.

The operation of the plug itself is perfectly clear because it penetrates the registering apertures in the walls of the headers closing the aperture to separate the headers and bringing the separate passages in the plug into communication with the respective headers. The clamping dog in my preferred form is balanced between two of the plugs so that if one superheater section is to be removed the dog is released from two, but of course the other section need not be removed.

I claim:

1. In a superheater for steam boilers the combination of a header containing saturated and superheated steam elements with a series of superheater flues, a superheater element for each of such flues having straight ended pipes and a connection from such ends to the header, said connection provided with a plug end containing connecting passages which fits into the header, the axes of such plug end and the superheater element being substantially parallel and out of line with each other.

2. In a superheater for steam boilers the combination of a header containing saturated and superheated steam chambers formed in the same integral casting with a series of superheater flues, a superheater element for each of such flues having straight ended pipes and a connection from such ends to the header, said connection provided with a plug end containing connecting passages which fits into the header the axes of such plug end and the superheater element being substantially parallel and out of line with each other.

3. In a superheater for steam boilers the combination of a header containing saturated and superheated steam elements with a series of superheater flues, a superheater element for each of such flues having straight ended pipes and a connection from such ends to the header, said connection provided with a plug end which fits into the header, the axes of such plug end and the superheater element being substantially parallel and out of line with each other and the plug seated toward the outer ends of the superheater flues.

4. In a superheater for steam boilers the combination of a header containing saturated and superheated steam chambers formed in the same integral casting with a series of superheater flues, a superheater element for each of such flues having straight ended pipes and a connection from such ends to the header, said connection provided with a plug end containing connecting passages which fits into the header the axes of such plug end and the superheater element being substantially parallel and out of line with each other and the plug seated toward the outer ends of the superheater flues.

5. In a superheater for steam boilers the combination of a header with a series of superheater flues, a series of superheater elements for such flues and a connection for each of said elements with the header containing a plug containing connecting passages which seats in the header toward the flue ends, the element being parallel with but out of line with the plug.

6. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages and a superheater element the ends of which communicate respectively each with one of said hollow arms.

7. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages and a superheater element the ends of which communicate respectively each with one of said hollow arms such element being located at one side of the header the arms projecting outwardly away from the header to engage the ends of the element.

8. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages and a superheater element the ends of which comprise straight pipes parallel with the axis of the element itself communicate respectively each with one of said hollow arms.

9. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages and a superheater element the ends of which comprise straight pipes parallel with the axis of the element itself communicate respectively each with one of said hollow arms such element being located at one side of the header the arms projecting outwardly away from the header to engage the ends of the element.

10. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages and a superheater element the ends of which communicate respectively each with one of said hollow arms the body of such superheater element being located on the side of the header opposite to the side on which the arms projecting from the plug are located.

11. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages and a superheater element the ends of which communicate respectively each with one of said hollow arms such element being located at one side of the header the arms projecting outwardly away from the header to engage the ends of the element, the body of such superheater element being located on the side of the header opposite to the side on which the arms projecting from the plug are located.

12. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages and a superheater element the ends of which comprise straight pipes parallel with the axis of the element itself communicate respectively each with one of said hollow arms the body of such superheater element being located on the sides of the header opposite to the side on which the arms projecting from the plug are located.

13. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages and a superheater element the ends of which comprise straight pipes parallel with the axis of the element itself communicate respectively each with one of said hollow arms such element being located at one side of the header the arms projecting outwardly away from the header to engage the ends of the element the body of such superheater element being located on the side of the header opposite to the side on which the arms projecting from the plug are located.

14. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages, a superheater element located at one side of and behind the headers extending outwardly to and in operative connection with said arms and means for holding the plug in position in the headers said means being releasable to permit simultaneous withdrawal of the plug and superheater element along a line parallel with the axis of the element.

15. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages, a superheater element located at one side of and behind the headers extending outwardly to and in operative connection with said arms and means for holding the plug in position in the headers said means being releasable to permit simultaneous withdrawal of the plug and superheater element along a line parallel with the axis of the element, said element being connected to said arms by straight pipes parallel with the axis of the element and rigidly mounted in such arms.

16. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages a superheater element comprising a large pipe in communication with one of said arms and a plurality of smaller pipes in communication each at one end with the large pipe and at the other end with another of said arms.

17. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages a superheater element comprising a large pipe in communication with one of said arms and a plurality of smaller pipes in communication each at one end with the large pipe and at the other end with another of said arms the arm communicating with the smaller pipes being expanded the smaller pipes being grouped about the larger pipe at the point where they communicate with such expanded arm.

18. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages a superheater element comprising a large pipe in communication with one of said arms and a plurality of smaller pipes in communication each at one end with the large pipe and at the other end with another of said arms the smaller pipes being grouped spirally about the larger.

19. In a superheater for steam boilers and the like adjacent saturated and superheated steam headers registering perforations therein, a connecting plug located within said perforations, passages therein communicating one with each of said headers, hollow arms extending outwardly from the plug communicating one with each of said passages a superheater element comprising a large pipe in communication with one of said arms and a plurality of smaller pipes in communication each at one end with the large pipe and at the other end with another of said arms the arm communicating with the smaller pipes being expanded the smaller pipes being grouped about the larger pipe at the point where they communicate with such expanded arm the smaller pipes being grouped spirally about the larger.

In testimony whereof I affix my signature, in the presence of two witnesses, this 6th day of May, 1916.

CHARLES W. DAKE.

Witnesses:
GENEVA HIRTH,
MINNIE M. LINDENAU.